Feb. 7, 1928.　　　　　　　　　　　　　　　　　　1,658,659
F. SKAUPY ET AL
PROCESS OF MANUFACTURING TRANSPARENT SUBSTANCES FROM
NONMETALLIC AND NONTRANSPARENT MATERIALS
Filed Oct. 5, 1923
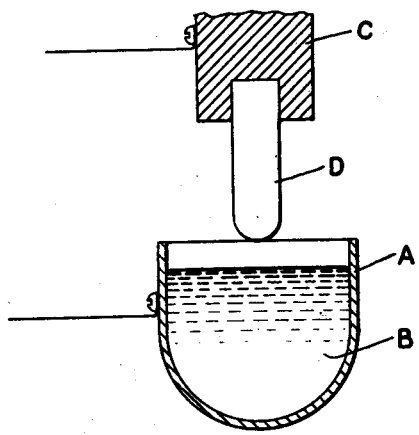
Inventors:
Franz Skaupy,
Hans Hoffmann,
Helmuth Schmidt,
by
Their Attorney.

Patented Feb. 7, 1928.

1,658,659

UNITED STATES PATENT OFFICE.

FRANZ SKAUPY, HANS HOFFMANN, AND HELMUTH SCHMIDT, OF BERLIN, GERMANY, ASSIGNORS TO GENERAL ELECTRIC COMPANY, A CORPORATION OF NEW YORK.

PROCESS OF MANUFACTURING TRANSPARENT SUBSTANCES FROM NONMETALLIC AND NONTRANSPARENT MATERIALS.

Application filed October 5, 1923, Serial No. 666,841, and in Germany February 23, 1923.

Our invention relates to the process of preparing transparent substances. More particularly, it relates to the preparation of transparent substances from non-metallic, opaque or translucent materials, such as oxides, fluorides and the like. The transparent substance thus prepared may be either vitreous in form, or in the macrocrystal or large crystal form. Such substances may be used either as light emitting bodies for electric lamps, or as artificial jewels, or for optical purposes. The figure in the accompanying drawing shows a form of equipment for carrying out the process of our invention.

The process consists in preparing pieces in the proper form from such opaque or translucent material, which formed pieces or forms may be rendered sufficiently conducting by pre-heating with a flame, for example, after which the forms may be used as conducting elements in a circuit or as electrodes of an arc. In order to increase the conductivity of these forms, and in order that the arc may be formed at comparatively low temperatures, the basic material or substance may be mixed with such substances as will lower their resistance. These pieces or forms may be made for instance from material such as that from which the so-called Nernst-luminous bodies are manufactured in which case yttrium oxide is added to the base of zirconium oxide. When making artificial corundum, it will be necessary to add only small quantities of feldspar which increases the conductivity of the aluminum oxide; a fraction of one per cent will be sufficient.

When the forms are used as the electrodes of an arc and terminals of the electrodes attain such high temperatures, due to the arc, they become transparent along a considerable distance, and also they may partly melt. When the Nernst substance is used in the arc treatment, the forms or electrodes which become transparent consist of rather large crystals, often of a single crystal. Substances can be added to the substance to be melted such as might give a certain color to the finished material. In the case of material for illuminating purposes, this is identical with endowing them with the capacity for radiating in determined or desired ranges of the spectrum. Cerium oxide, chromium oxide, oxide of manganese and similar oxides, are especially suitable for this purpose. In general, alternating current, especially current of high frequency, is to be preferred instead of direct current in carrying out the process since otherwise, electrolysis takes place and a milky flux is obtained, that is, clear crystalline body may be obtained which will remain clear if subsequently used in connection with direct current, but there is danger that the crystal will become turbid if used in connection with alternating current. In order to avoid this danger the crystal should be made with alternating current.

The substance which are thus made transparent can be shaped in any desired manner; for instance, by mechanical treatment, such as blasting, grinding, etc., or by chemical operations, such as etching. When thick formed pieces are used as electrodes, the inner part of the substance becomes hotter than the outer and melts before the latter, so that the melting of the fused mass causes the formation of rather regular tubular and transparent parts. It is also possible to manufacture rod shaped bodies from such masses by drawing the molten material into threads or rods before it solidifies. As far as the manufacture of rod-shaped or thread-shaped bodies from molten material is concerned, the well-known process of Czrochalski can be used in this connection for the production of single crystals out of molten metal (printed in the Zeitschrift for Physical Chemistry, volume 92, year 1917, page 219). As is well known, by the last named process a body of like or higher melting temperature, suspended on a thread, can be dipped into the molten metal and moved upward in it with a velocity which is the same as, or less than, the velocity of the crystal growth. By this means the body draws after itself a thread out of the molten mass, which, on account of the definite velocity of the motion of the body which is being withdrawn, immediately passes over into the single crystal condition. In the same way the opaque, oxidic body, which is used as an electrode of an arc, can also be drawn out into thin rods or threads, as soon as it has become vitreous and has passed over into the molten flux. For the drawing out process a transparent body of the same basic material which has already been manufactured can be used.

It is not absolutely necessary that the arc be formed between the two formed electrode pieces consisting of the oxide material that is to be made transparent. If necessary, one formed piece merely of the opaque substances may be used for one electrode, while the other electrode may consist of a molten salt or oxide. In this case, the formed piece may be combined with or held by the metal electrode and in order to carry out the process in this case, it is advisable to dip the formed piece and the electrode in a receptacle containing, for instance, molten sodium chloride, constituting the other electrode. In this manner, current is made to flow between the two electrodes and due to the resistance, the formed piece becomes preheated. The formed piece, when preheated in this manner, may be slowly withdrawn from the receptacle together with its metal electrode. This permits the continuance of current flow between the receptacle or the molten salt of oxide contained therein and the metal electrode holding said formed piece, which formed piece is thereby subjected to further heating due to the passage of the current. As soon as the preheated formed piece is entirely withdrawn from the receptacle, an arc is formed between the receptacle, that is to say, between the salts or oxides contained therein and the formed piece, so that the latter becomes transparent at the parts adjacent to the arc. Such salt or oxide particles which would possibly adhere to the formed part or electrode when the latter is withdrawn from the molten salt or oxide path, are immediately evaporated due to the highly heated condition of the electrode due to the action of the arc. If the process of preheating with the electric current by resistance is continued for a sufficient period, then the formed piece can be securely and more quickly transformed into the transparency condition by the following action of the electric arc. By the use of the arc process there is the distinct advantage that the transformation from the opaque to the transparent condition is carried on better, in a simpler, quicker and surer way than heretofore.

A better understanding of the invention when only one formed piece is used may be had by referring to the accompanying drawing. A pot A may be used, which may be filled, for example, with molten sodium chloride B. Above this part there is a copper holder C into which the formed piece D to be made transparent is inserted. The holder, together with the formed piece makes up one electrode and the molten sodium chloride the other electrode. In order to effect the crystallization or the change of transparency of the formed piece, the holder, together with the formed piece, is moved downward until the holder projects into the sodium chloride. Then the holder will serve not only as a current conductor, but also as a metal electrode. Since the actual electrode, that is, the formed oxide piece is not conductor to start with, only the metal electrode, that is, the copper holder, will act during the early stage of immersion. The molten sodium chloride constitutes a resistance through which the current flows and which becomes heated, heating in turn the formed piece as explained, rendering the same conductive. If the holder, together with the formed piece is now withdrawn from the sodium chloride, an arc will immediately form between the sodium chloride and the heated formed piece.

What we claim as new and desire to secure by Letters Patent of the United States, is:

1. The process of transforming an opaque poor conducting material into a transparent form which consists in using the material as the electrode of an arc until it becomes transparent.

2. The process of making a transparent body which consists in making the body of a mixture of an opaque poor conducting substance with a material which renders the mass a better conductor and in thereafter using the body as an electrode in an arc until it becomes transparent.

3. The process of making a transparent body which consists in making the body of a mixture of an opaque poor conducting substance with a material which renders the mass a better conductor and in thereafter using the body as an electrode in an arc until a section of it becomes transparent, said arc being a high frequency arc whereby electrolytic action in the substance is prevented during the process of transformation.

4. The process of making a transparent selective light-radiating body which consists in making the body of a mixture of an opaque substance with an auxiliary material which renders the body in final form a selective light-radiator and in using the body as the electrode of an arc until it becomes a selective and transparent light-radiator.

5. The process of transforming an opaque substance into a transparent one and forming it, which consists in using the substance as an electrode of an arc until it becomes transparent and plastic and drawing the plastic body into form.

6. The process of transforming an opaque substance into a transparent one which consists in using the substance as an electrode of an arc, the opposite electrode of which is a salt, and until it becomes transparent.

7. The process of making a transparent body which consists in mixing with a poor conducting opaque substance a material to render the substance a better conductor and also with a second material to render the body in final form a selective light-radiator, and in thereafter using the mixture as an electrode in an arc until it becomes a selective and transparent light-radiator.

8. The process of transforming an opaque substance into a transparent one which consists in forming the substance to serve as an electrode in an arc, placing the form in a salt and closing an electric circuit through the electrode and the salt in series for heating the electrode in the salt and thereafter withdrawing the electrode from the salt in order to establish an arc between the salt and the electrode and maintaining the arc until the electrode becomes transparent.

9. The process of transforming a formed body consisting of an opaque substance into a transparent one which consists in using the form as an electrode of an arc until it becomes transparent.

10. The process of manufacturing a transparent body which consists in mixing with a poor conducting opaque substance an auxiliary material to render the substance a better conductor, forming a piece from the substance and using the form as an electrode in an arc until the piece becomes transparent.

11. The process of manufacturing a transparent body which consists in mixing with a poor conducting opaque substance an auxiliary material to render the substance a better conductor, forming a piece from the mixture and using the form as an electrode in a high frequency arc until a section of it becomes transparent.

12. The process of manufacturing a transparent body which consists in mixing with a poor conducting opaque substance an auxiliary material to render the substance a better conductor and also with a second auxiliary material to render the body in final form a selective light-radiator, forming a piece from the mixture and using the piece as an electrode in an arc until a section of the piece becomes a transparent selective light-radiator.

13. The process of manufacturing and transforming an opaque body into a formed transparent body which consists in mixing with a poor conducting opaque substance an auxiliary material to render the substance a better conductor and also with a second auxiliary material to render the body in final form a selective light-radiator, forming the body from the mixture and using the form as an electrode in a high frequency arc until it becomes a transparent selective light-radiator.

14. The process of transforming a poor conducting material into a transparent form which consists in heating the material to render it a better conductor and thereafter using the material as the electrode of an arc until the material becomes transparent.

15. The process of making a transparent material from an opaque poor conducting material which consists in shaping the material into a form to serve as a rigid electrode of an arc and in thereafter heating the form to render it a better conductor and using it as the electrode of an arc until it becomes transparent.

16. The process of making a transparent body which consists in mixing with a poor conducting opaque substance a material to render the substance a better conductor and in then making a rigid form of the material adapted to serve as an arc electrode and in thereafter using the form as an electrode in an arc until it becomes transparent.

17. The process of transforming an opaque material of high resistivity into a transparent form which consists in using the material as the electrode of an alternating current arc until it becomes transparent.

In witness whereof, we have hereunto set our hands this 15th day of September, 1923.

FRANZ SKAUPY.
HANS HOFFMANN.
HELMUTH SCHMIDT.